(12) United States Patent
Moses et al.

(10) Patent No.: US 7,243,871 B2
(45) Date of Patent: Jul. 17, 2007

(54) DATA STORAGE TAPE CARTRIDGE AND LEADERING MECHANISM INTERACTION

(75) Inventors: Jason E. Moses, Breckenridge, MN (US); James L. Albrecht, Wahpeton, ND (US); William E. Linton, St. Paul, MN (US); Michael A. Mewes, Fargo, ND (US)

(73) Assignee: Imation Corp., Oakdale, MN (US)

( * ) Notice: Subject to any disclaimer, the term of this patent is extended or adjusted under 35 U.S.C. 154(b) by 350 days.

(21) Appl. No.: 10/952,675

(22) Filed: Sep. 29, 2004

(65) Prior Publication Data

US 2006/0071109 A1   Apr. 6, 2006

(51) Int. Cl.
*G11B 23/107* (2006.01)
(52) U.S. Cl. ............................ 242/348.2; 242/332.4; 360/85; 360/95; 360/132

(58) Field of Classification Search ............. 242/348.2, 242/332.4; 360/132, 85, 95
See application file for complete search history.

(56) References Cited

U.S. PATENT DOCUMENTS

| | | | |
|---|---|---|---|
| 6,345,779 B1 | 2/2002 | Rambosek | |
| 6,435,439 B1 | 8/2002 | Ishihara et al. | |
| 6,505,789 B2 | 1/2003 | Ridl et al. | |
| 6,662,566 B2 | 12/2003 | Berg et al. | |
| 6,698,675 B2 | 3/2004 | Brown et al. | |
| 6,953,169 B2 * | 10/2005 | Morita et al. | ............ 242/326.2 |

* cited by examiner

*Primary Examiner*—John Q. Nguyen
(74) *Attorney, Agent, or Firm*—Eric D. Levinson (57) ABSTRACT

A data storage tape cartridge providing robust interactions with leadering mechanisms of data storage tape drives. In one relevant aspect, a data storage tape cartridge includes improved leader member access area features, such as a docking ramp configured to transition from a first height, to a second height greater than the first.

19 Claims, 9 Drawing Sheets

DATA STORAGE TAPE CARTRIDGE AND LEADERING MECHANISM INTERACTION

THE FIELD OF THE INVENTION

The present invention relates to a data storage tape cartridge. More particularly, the present invention relates to a data storage tape cartridge facilitating repeatable and accurate tape drive leadering mechanism interactions with the data storage tape cartridge.

BACKGROUND OF THE INVENTION

Data storage tape cartridges have been used for decades in the computer, audio, and video fields. The data storage tape cartridge continues to be an extremely popular means of recording large volumes of information for subsequent retrieval and use.

Data storage tape cartridges typically consist of an outer shell or housing maintaining at least one tape reel assembly and a length of magnetic storage tape. The storage tape is wrapped about a hub portion of the tape reel assembly and is driven through a defined tape path by a separate driving mechanism of a data storage tape drive. The housing normally includes a separate cover and base, which are assembled together via a variety of fastening means known in the art. The housing also has an access opening, or access window, at a forward portion of one of four sides of the housing. With a single reel design, the access opening allows access to a leader member and, consequently, a leading end of the storage tape connected to the leader member.

Generally speaking, the data storage tape cartridge is inserted into a tape drive that then accesses the leader member through the access opening. In a reel-to-reel magnetic tape drive, the leader member and leading end of the storage tape is directed away from the cartridge housing to an adjacent area within the data storage tape drive where the read/write head is located. In order to allow access to the tape, the leader member is removably secured within the housing. In this manner, the data storage tape drive can capture, or otherwise dock with and retrieve the leader member in order to assist in guiding the storage tape from the housing.

One commonly encountered leader member is a "leader pin" that can be accessed by a leadering mechanism of a data storage tape drive, sometimes termed a "claw." In particular, the "claw" accesses the leader pin through the access opening by swinging through a sweep path from outside the access opening, into the access opening, and to the leader pin. In this manner, the magnetic tape can be wound onto a drive take-up reel while data on the storage tape is being accessed/recorded by the read/write head.

For reasons not previously understood or problems not otherwise fully addressed, the drive leadering mechanism has not shown optimal repeatability in docking with, capturing, and retrieving the leader member. As such, improvements with an eye towards more robust leadering mechanism interactions with the data storage tape cartridge remain to be addressed.

SUMMARY OF THE INVENTION

One aspect of the present invention relates to a data storage tape cartridge including a housing having an access opening for accessing an interior of the data storage tape cartridge. The housing includes a first interior surface proximate the access opening, the first interior surface including a retention wall and a docking ramp. The docking ramp is configured to transition lengthwise from an entry height to a capture height greater than the entry height, such that a leadering mechanism traveling through a sweep path is guided to the leader member capture height. The data storage tape cartridge also includes a tape reel assembly including a hub, the tape reel assembly disposed within the housing. Furthermore, a storage tape is wrapped about the hub with a leader member fixed to a leading end of the storage tape, the leader member removably secured to the retention wall of the housing.

Another aspect of the present invention relates to a system for accessing a leader member of a data storage tape cartridge. The data storage tape cartridge includes a housing having an accessing opening, a first interior surface of the housing proximate the access opening including a retention wall and a docking ramp. The docking ramp defines a capture height proximate the retention wall and an entry height opposite the capture height. As such, the docking ramp transitions lengthwise from the entry height to the capture height greater than the entry height. In particular, the docking ramp is configured to guide a leadering mechanism to the capture height as the leadering mechanism travels through a sweep path. An included tape reel assembly comprises a hub and is disposed within the housing. Wrapped about the hub is the storage tape, with a leader member affixed to a leading end of the storage tape. Furthermore, the leader member abuts against and is removably secured to the retention wall of the housing. A data storage tape drive including the leadering mechanism is also part of the system. The leadering mechanism is configured to capture and remove the leader member of the data storage tape cartridge by entering the access opening and traveling through the sweep path to the leader member.

Yet another aspect of the present invention relates to a method for accessing a leader member of a data storage tape cartridge. The method includes moving a leadering mechanism of a data storage tape drive into an access opening of a data storage tape cartridge. The method also includes moving the leadering mechanism through a sweep path to access a leader member of the data storage tape cartridge, the leader member removably secured to a retention wall formed by a first interior surface of the housing proximate the access opening. The leadering mechanism is guided as it moves through the sweep path to a capture height via a docking ramp, the docking ramp transitioning lengthwise from an entry height to a capture height. The leadering mechanism is docked with a leader member which is also captured with the leadering mechanism. Further, the leader member is removed from the data storage tape cartridge through the access window with the leadering mechanism.

BRIEF DESCRIPTION OF THE DRAWINGS

The accompanying drawings are included to provide further understanding of the present invention and are incorporated in and constitute a part of this Specification. The drawings illustrate the embodiments of the present invention and together with the description serve to explain the principles of the invention. Other embodiments of the present invention and many of the intended advantages of the present invention will be readily appreciated with reference to the Detailed Description when considered in connection with the accompanying drawings. In the drawings, like reference numerals designate like parts throughout the figures.

DETAILED DESCRIPTION OF THE PREFERRED EMBODIMENTS

Figure 1:
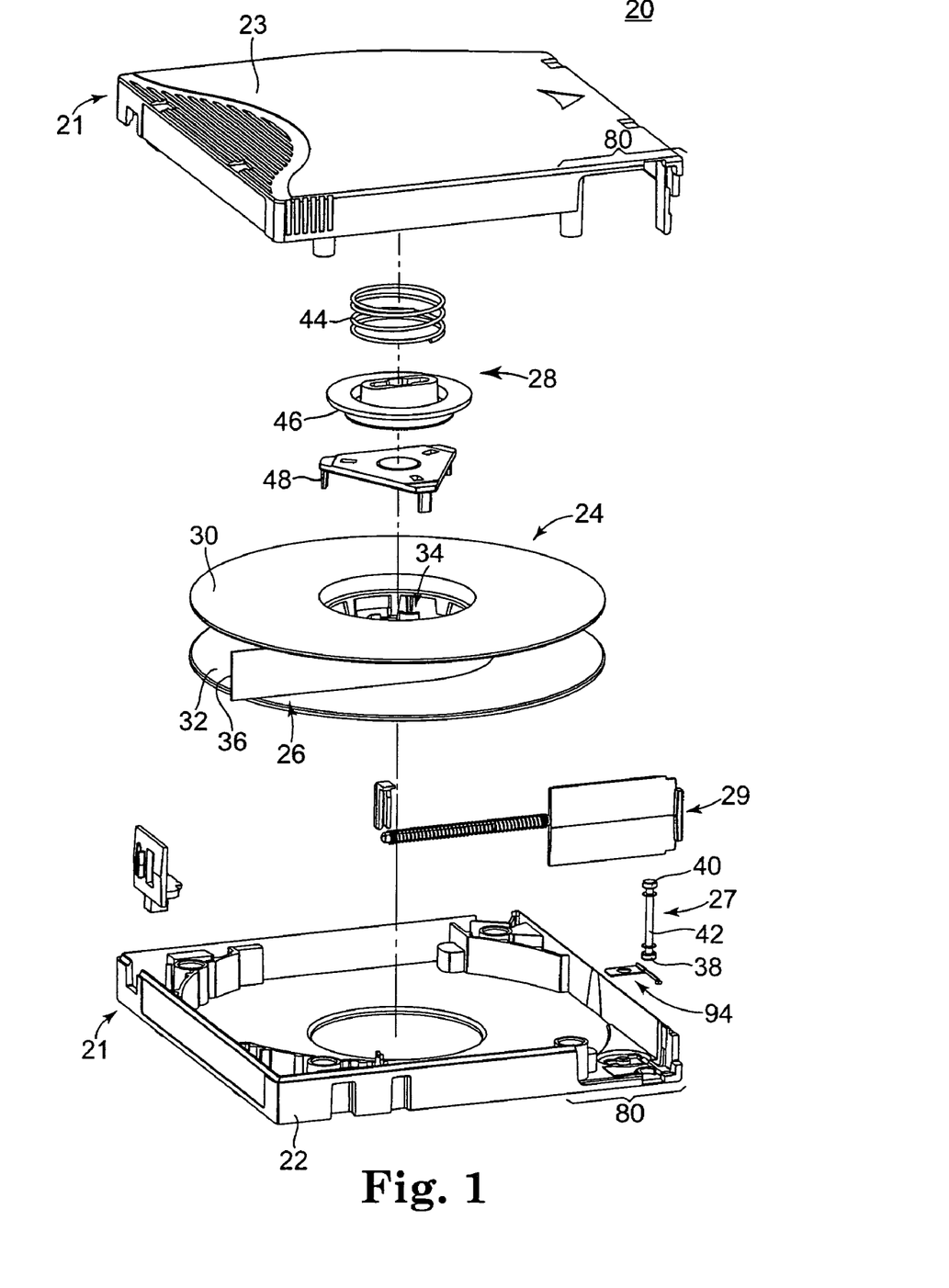
FIG. 1 is an exploded perspective view of an embodiment data storage tape cartridge in accordance with the present invention.

One embodiment of a data storage tape cartridge in accordance with the present invention is shown in FIG. 1 and designated by reference numeral 20. Generally, the data storage tape cartridge 20 includes a housing 21; a tape reel assembly 24; a storage tape 26; a leader member 27 affixed to the storage tape 26 (shown separate); a brake assembly 28; and a door assembly 29.

The housing 21 is configured to be receivable in a typical data storage tape drive. For example, the housing may be sized for use within a 5.25-inch (130 mm) form factor drive or a 3.5-inch (90 mm) form factor drive. More generally, the housing 21 is preferably sized for use in a linear tape open (LTO) data storage tape drive. In one embodiment, the housing 21 includes a first housing section 22 and a second housing section 23. The first housing section 22 can be alternatively referred to as "a base" 22, whereas the second housing section 23 can be referred to as "a cover" 23. However, as used throughout the Specification, directional terminology, such as: "cover"; "base"; "upper"; "lower"; "top"; "bottom"; etc., are used for purposes of illustration only and are in no way limiting.

With that in mind, the first and second housing sections 22, 23 are preferably generally rectangular open boxes and configured to be reciprocally mated to one another. In this manner, the base 22 and the cover 23 combine to define a rectangular enclosure having an interior and an exterior. Means of securing the combined base 22 and cover 23 together include screws, clips, snap fits, glues, or other fastening means. In order to access the interior of the housing 21, and the storage tape 26 housed therein, the housing 21 includes a leader member access area 80. As will be described in greater detail below, the leader member access area 80 includes an access opening 82 into an interior of the housing 21. Along these lines, the data storage tape cartridge 20 includes a door assembly 29. The door assembly 29 is slidably secured to the housing 21 in order to allow selective access via the access opening 82 to the interior of the housing 21. The door assembly 29 is biased or spring-loaded to a closed position to protect storage tape 26 otherwise maintained in the housing 21 from contamination when the data storage tape cartridge 20 is not in use.

The tape reel assembly 24 can be of a type known in the art and preferably includes an upper flange 30, a lower flange 32, and a hub 34. The hub 34 is generally ring-shaped and configured to accommodate the storage tape 26 as it is wound and unwound from the tape reel assembly 24. Along these lines, the upper flange 30 and the lower flange 32 are situated on opposing sides of the hub 34, and preferably act to prevent the storage tape 26 residing on the hub 34 from telescoping.

The storage tape 26 can be a magnetic tape of a type commonly known in the art. For example, the storage tape 26 can consist of a balanced polyethylene naphthalate (PEN) based material coated on one side with a layer of magnetic material dispersed within a suitable binder system, and on the other side with a conductive material dispersed within a suitable binder system. Acceptable tape is available, for example, from Imation Corp., of St. Paul, Minn. The storage tape 26 is configured to be wound about the hub 34 as shown. The storage tape 26 defines a leading end 36, which is a free, exposed end of the storage tape 26 as wound about the hub 34. Conversely, a trailing end (not shown) of the storage tape 26 is covered by wraps of the storage tape 26 as wound about the hub 34.

The leader member 27 can generally be of a type known in the art and is configured to be associated with the leading end 36 of the storage tape 26 in a fixed manner, though shown separate in the figures described herein. In one embodiment, the leader member 27 is configured to be associated with the leading end 36 of the storage tape 26 via a length of leader tape (not shown). For example, the leader member 27 can be affixed to a first end of the leader tape, with the leading end 36 of the storage tape 26 affixed to a second end of the leader tape. In one embodiment, the leader member 27 defines a first end 38 and an opposing second end 40. The two ends 38, 40 are connected by an elongate member 42 running therebetween. In one embodiment, the leader member 27 is a leader pin of a type generally known in the art. In a related embodiment, the leader pin defines a round, tubular "bar bell" shape. Additionally, the storage tape 26 can be affixed to the elongate member 42, or the middle section of the barbell shape, of the leader member 27.

The brake assembly 28 can be a brake assembly of a type known in the art. In one embodiment, the brake assembly 28 includes a brake spring 44, a brake button 46, and a brake plate 48, sometimes termed a "spider plate" in particular applications. The brake spring 44, the brake button 46, and the brake plate 48 are assembled to one another such that the brake assembly 28 is capable of exerting rotational resistance on the tape reel assembly 24. Generally, the rotational resistance, or braking action, is released when a data storage tape drive chuck (not shown) accesses the data storage tape cartridge 20.

The brake assembly 28, the tape reel assembly 24, and the housing 21 can be assembled together in a manner known in the art, including the brake assembly 28 being co-axially received by the tape reel assembly 24. Also, the assembled tape reel assembly 24, including the storage tape 26 wound thereon, and brake assembly 28 are preferably disposed within the interior of the housing 21 such that the tape reel assembly 24 can rotate within the housing 21. In this manner, the storage tape 26 can be wound or unwound from the hub 34 while being protected within the confines of the housing 21. Furthermore, and as alluded to above, the tape reel assembly 24 can be selectively locked by the brake assembly 28 to the housing 21 to prevent rotation, i.e., unintended winding and unwinding of the data storage tape from the hub 34 when the data storage tape cartridge 20 is not being accessed by a data storage tape drive (not shown).

In order to better understand the advantages achieved by the present invention, an embodiment leader member access area 80 of the data storage tape cartridge 20 in accordance with the present invention is described in greater detail with reference first to FIG. 2. Generally speaking, the leader member access area 80 is configured to removably secure the leader member 27 within the housing 21, while allowing the data storage tape drive (not shown) to access the leader member 27 and associated storage tape 26 (FIG. 1) when desired.

The leader member access area 80 is preferably located at one of four corners of the housing 21. The leader member access area 80 includes an access opening 82 formed in a housing side 84, a first interior surface 86 defining an access opening bottom wall 88, a second interior surface 90 defining an access opening top wall 92, and at least one retaining spring 94 (FIG. 1). As described below, the leader member access area 80 is configured such that the first interior surface 86 and the second interior surface 90 act in concert to maintain the leader member 27 in an access position for the data storage tape drive (not shown).

Figure 2:
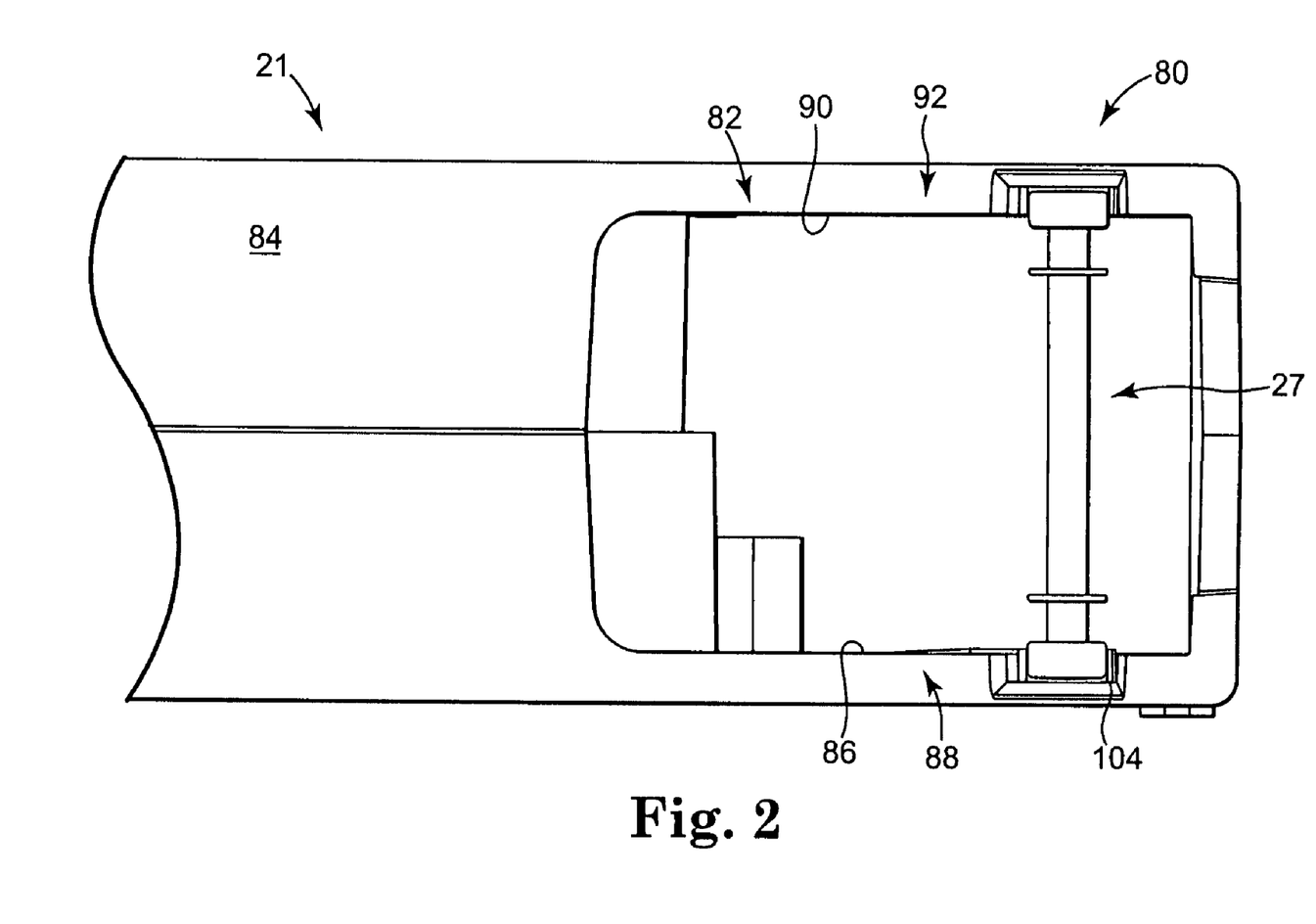
FIG. 2 is a front view of a leader member access area of the embodiment data storage tape cartridge of FIG. 1.

As shown in FIG. 2, the access opening 82 is generally rectangular in shape and sized to facilitate drive access to the leader member 27. In one exemplary embodiment, the access opening 82 defines a length of 0.87+/−0.1 inches and a height of 0.69+/−0.01 inches. However, it is to be understood by those of ordinary skill in the art that alternative dimensions or shapes can be implemented for the access opening 82 without departing from the scope of the present invention.

Figure 3:
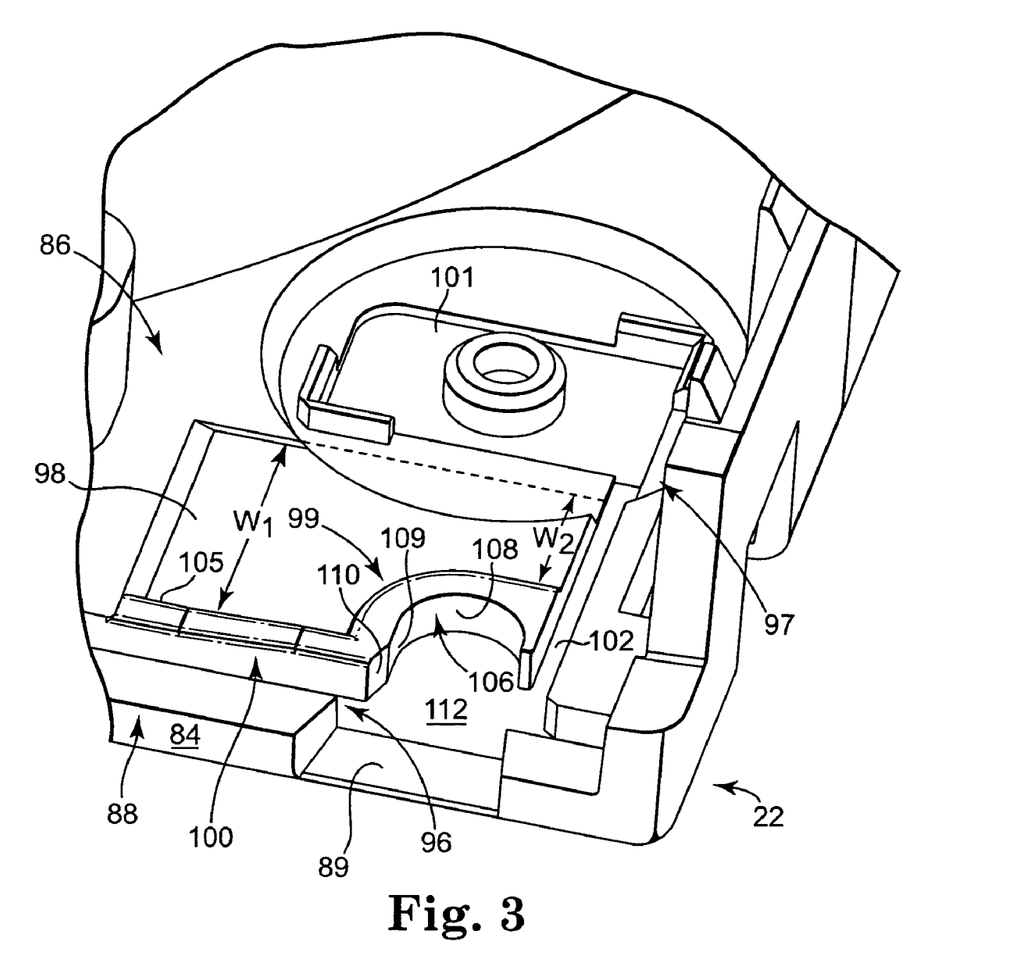
FIG. 3 is a perspective view of a portion of the leader member access area.

With reference to FIG. 3, the first interior surface 86 forms the access opening bottom wall 88, a door slot 96, a spring seat 97, a recessed area 98, a retention wall 99, and a docking ramp 100.

Figure 4:
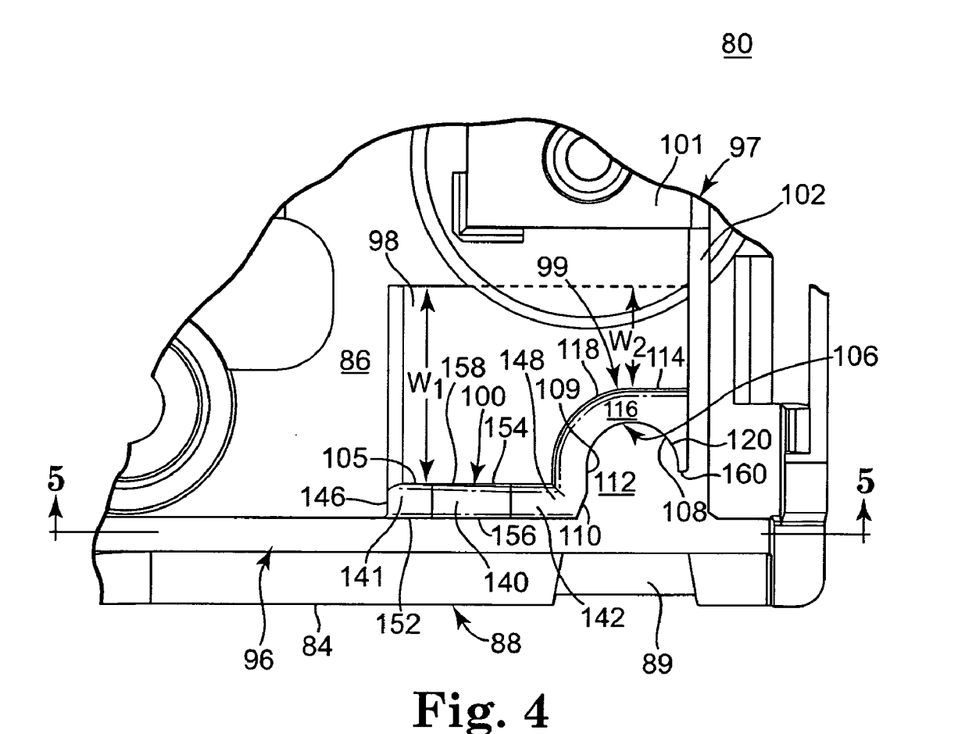
FIG. 4 is a plan view of the portion of the leader member access area.

With reference to FIGS. 3 and 4, the access opening bottom wall 88 extends along a perimeter of the first housing section 22 and a bottom portion of the access opening 82. Additionally, the access opening bottom wall 88 is interrupted by a clearance notch 89 extending through the access opening bottom wall 88. As will be understood better with reference to the system and method described below, the clearance notch 89 facilitates removal and replacement of the leader member 27 in the housing 21.

The door slot 96 is configured to slidably maintain the door assembly 29 and can be described as a groove in the first interior surface 86 running generally parallel to the side 84 of the housing 21 (FIG. 1). In one embodiment, a portion of the door slot 96 is formed between the access opening bottom wall 88 and the docking ramp 100. In the embodiment, the door slot 96 generally extends at a width and for a length sufficient to slidably secure the door assembly 29 to the housing 21, thus allowing door assembly 29 to transition between closed and open positions. Though not shown, a complementary door slot is defined by the second interior surface 90 (FIG. 2) to assist in proper functioning of the door assembly 29. However, it is to be recognized that alternative means of slidably securing the door assembly 29 to the housing 21 can be employed without departing from the scope of the present invention.

As shown in FIGS. 3 and 4, the spring seat 97 is formed by the first interior surface 86 and preferably includes a spring base keeper 101 and spring finger track 102. In one embodiment, and as described below, the spring base keeper 101 corresponds to a shape of the retaining spring 29 (FIG. 1). Similarly, the spring finger track 102 is configured to receive a finger of the retaining spring 29 (FIG. 1). However, those having ordinary skill in the art will recognize that alternative configurations suitable for securing the retaining spring 29 can be employed without departing from the scope of the present invention.

The first interior surface 86 can be configured to help minimize unnecessary contact between the data storage tape drive (not shown) and the first interior surface 86 by incorporating the recessed area 98. For instance, in one embodiment, the recessed area 98 is located behind the retention wall 99 and the docking ramp 100. The recessed area 98 preferably has a height that is recessed relative to the retention wall 99. In one exemplary embodiment, the recessed area 98 is recessed approximately 0.006+/−0.004 inches relative to a height of the retention wall 99. However, the recessed area 98 can be alternatively described as having a height that is recessed in relation to a height of the docking ramp 100.

In one embodiment, the recessed area 98 is bordered on a front side 105 by the retention wall 99 and the docking ramp 100. The recessed area 98 extends rearward from the front side 105 into the interior of the housing 21 (FIG. 1) and away from the housing side 84. Generally speaking, the recessed area 98 preferably terminates prior to the spring base keeper 101. In one embodiment, the recessed area 98 extends rearward relative to a portion of the border defined by the docking ramp 100 to define a first width W1 and rearward relative to a portion of the border defined by the retention wall 99 to define a second width W2. For example, in one embodiment, the first width W1 is approximately 0.285+/−0.01 inches while the second width W2 is approximately 0.15+/−0.01 inches. While preferred dimensions for the recessed area 98 have been generally presented herein, it should be recognized that alternative dimensions and shapes from those described and shown in the figures can be employed. In particular, configurations that minimize unnecessary contact between the data storage tape drive (not shown) and the interior surface 86 can vary according to a particular application.

Figure 5:
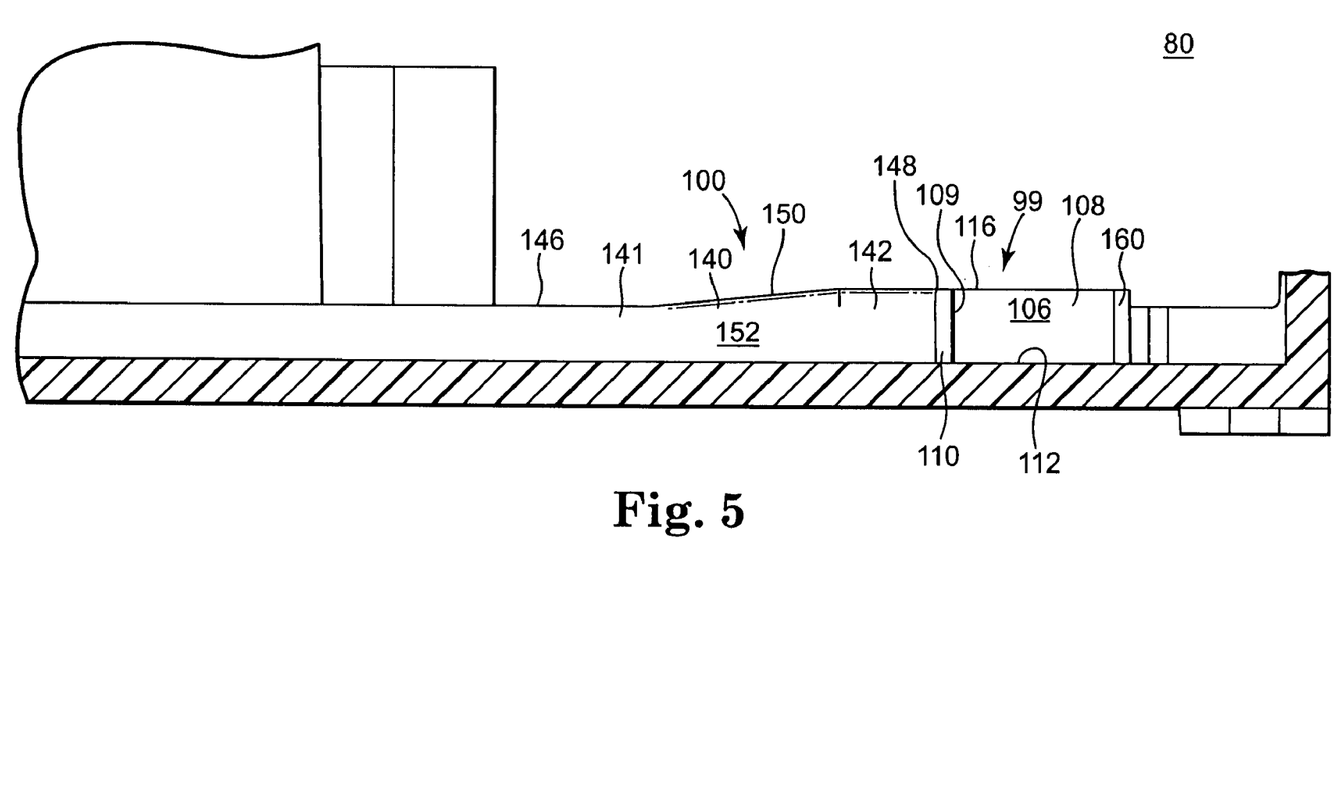
FIG. 5 is a cross-sectional front view of the portion taken along line 5-5 shown in FIG. 4.

With reference to FIGS. 4 and 5, the retention wall 99 generally acts as a support for the leader member first end 38 (FIG. 1) to abut against and defines a front face 106. In one embodiment, the retention wall includes a first section 108, a second section 109, and a third section 110. The first section 108 defines a complementary shape to at least a portion of the leader member first end 38. As shown, a portion of the first section 108 preferably defines an arc configured to contact an arcuate portion of leader member first end 38. A portion of the second section 109 preferably extends tangentially from the arcuate portion of first section 108 to act as a guide surface, as described below. In one exemplary embodiment, the tangential portion of the second section 109 extends for a length of approximately 0.04+/−0.004 inches. A portion of the third section 110 preferably extends from, and at an obtuse angle to, the tangential portion of the second section 109. Further, in one embodiment, the retention wall 99 borders a landing surface 112 on which the leader member first end 38 rests when removably secured within the leader member access area 80.

In one exemplary embodiment, the retention wall 99 defines a height of approximately 0.05+/−0.002 inches relative to the landing surface 112. Further, the retention wall 99 defines a uniform height of approximately 0.05+/−0.002 inches relative to the landing surface 112. In other words, each of the sections 108, 109, 110 can define a similar height. However, it is to be noted that in an alternative embodiment, the retention wall 99 can vary in height as it extends to define sections 108, 109, 110. Furthermore, the height of the retention wall 99 can alternatively be defined relative to the access opening bottom wall 88. As such, in one embodiment, the height of the retention wall 99 is approximately 0.007+/−0.002 inches relative to the access opening bottom wall 88. Further, the height of the retention wall 99 can be described with reference to the docking ramp 100. In one embodiment, the retention wall 99 defines substantially the same height as a maximum height of the docking ramp 100.

The retention wall 99 also defines a back face 114. In one embodiment, the recessed area 98 acts to define the back face 114. In the embodiment, the retention wall back face 114 and a retention wall top face 116 combine to define a retention wall back edge 118. At least a section of the back edge 118 can be relieved with a chamfer or a round, for example. In one embodiment, the entire back edge 118 is chamfered to relieve the edge from any substantially 90-degree angles. In particular, the back edge 118 is relieved such that the back edge 118 is generally rounded in transverse cross-section. In one exemplary embodiment, the back edge 118 is relieved at a radius of approximately 0.015+/−0.005 inches. In another embodiment, the back edge 118 is relieved with a chamfer at an angle. In a related embodiment, a retention wall front edge 120, defined by the top face 116 and the front face 106, is relieved. In one embodiment, the front edge 120 is relieved such that the front edge 120 is rounded in transverse cross-section. Furthermore, one embodiment includes the door slot 96 residing in front of the retention wall 99 and the recessed area 98 residing behind the retention wall 99 such that the retention wall 99 defines the front and back faces 106, 114. As such, the retention wall 99 may be loosely described as defining a freestanding wall. As used, "freestanding" generally indicates that the retention wall 99 is unsupported on either of faces 106, 114.

Turning now to the docking ramp 100, the docking ramp 100 includes a transition section 140, an entry section 141, and a capture section 142. While alternative embodiments include the transition section 140 alone, the docking ramp 100 can define the three sections 140, 141, 142 as shown. The entry section 141 extends from a docking ramp first end 146 and the docking ramp capture section 142 extends from a docking ramp second end 148 with the transition section 140 located therebetween.

Generally speaking, each of the sections 140, 141, 142 is named according to a height that the respective section defines, and in particular, that each respective section defines relative to a leadering mechanism (FIGS. 7A-7D) entering the leader member access area 80. In other words, the entry section 141 is the length over which the docking ramp 100 defines an entry height. Similarly, the transition section 140 corresponds to the length over which the docking ramp 100 transitions between defining the entry height and defining a capture height. Finally, the capture section 142 is a length over which the docking ramp 100 defines a capture height. However, as noted above, in alternative embodiments the transition section 140 can begin at the docking ramp first end 146 and extend to the docking ramp second end 148, such that the entry section 141 and/or the capture section 142 are effectively omitted.

As shown in FIGS. 4 and 5, the transition section 140 preferably transitions smoothly from the entry height to the capture height at an angle, and in a generally linear manner. In other words, the transition section 140 is devoid of any steps or overly sudden changes in height. In one exemplary embodiment, the docking ramp 100 transitions between the two heights at an angle of approximately 1.8+/−0.3 degrees. In an alternative embodiment, the docking ramp 100 transitions from the entry height to the capture height in a curvilinear manner such that the transition section 140 defines a concave profile. In another embodiment, the transition section 140 defines a convex profile.

The docking ramp 100 includes a top face 150, a front face 152, and a back face 154, wherein the recessed area 98 serves to define the back face 154 and the door slot 96 serves to define the front face 152 in one embodiment. The top face 150 and the front face 152 combine to define a front edge 156 (shown more clearly in FIG. 4), whereas the top face 150 and the back face 154 combine to define a back edge 158. In one embodiment, a section of the front edge 156, the back edge 158, or both, is relieved such that the edges 156, 158 are rounded. In the embodiment shown, the entire front edge 152 and the entire back edge 158 are relieved such that the edges 156, 158 are rounded. In an exemplary embodiment, the edges 156, 158 are rounded at a radius of 0.008+/−0.003 inches. In another embodiment, the edges are relieved with an angled chamfer. In one exemplary embodiment, the chamfer angle is approximately 45+/−3 degrees.

As previously described, one embodiment includes the door slot 96 residing in front of the docking ramp 100 and the recessed area 98 residing behind the docking ramp 100. As such, the docking ramp 100 may also be generally described as defining a freestanding wall. Once again, "freestanding" generally indicates that the docking ramp 100 is unsupported on either of its front or back faces 152, 154. As shown, the docking ramp second end 148 is preferably continuous with the retention wall 99. As such, in one embodiment, the retention wall 99 is substantially the same height as the docking ramp capture section 142. Additionally, the docking ramp 100 and retention wall 99 extend continuously from the docking ramp first end 146 to the terminal end 160 of the retention wall 99 to define a single continuous freestanding wall.

In one embodiment, a total length of the docking ramp 100 is approximately 0.250+/−0.01 inches. In a related embodiment, but in terms of the sections 140, 141, 142, the entry section 141 defines a length of approximately 0.042+/−0.005 inches, the transition section 140 defines a length of approximately 0.15+/−0.005 inches, and the capture section 142 defines a length of approximately 0.058+/−0.005 inches. Additionally, the docking ramp 100 defines a width of approximately 0.045+/−0.005 inches.

Figure 6:
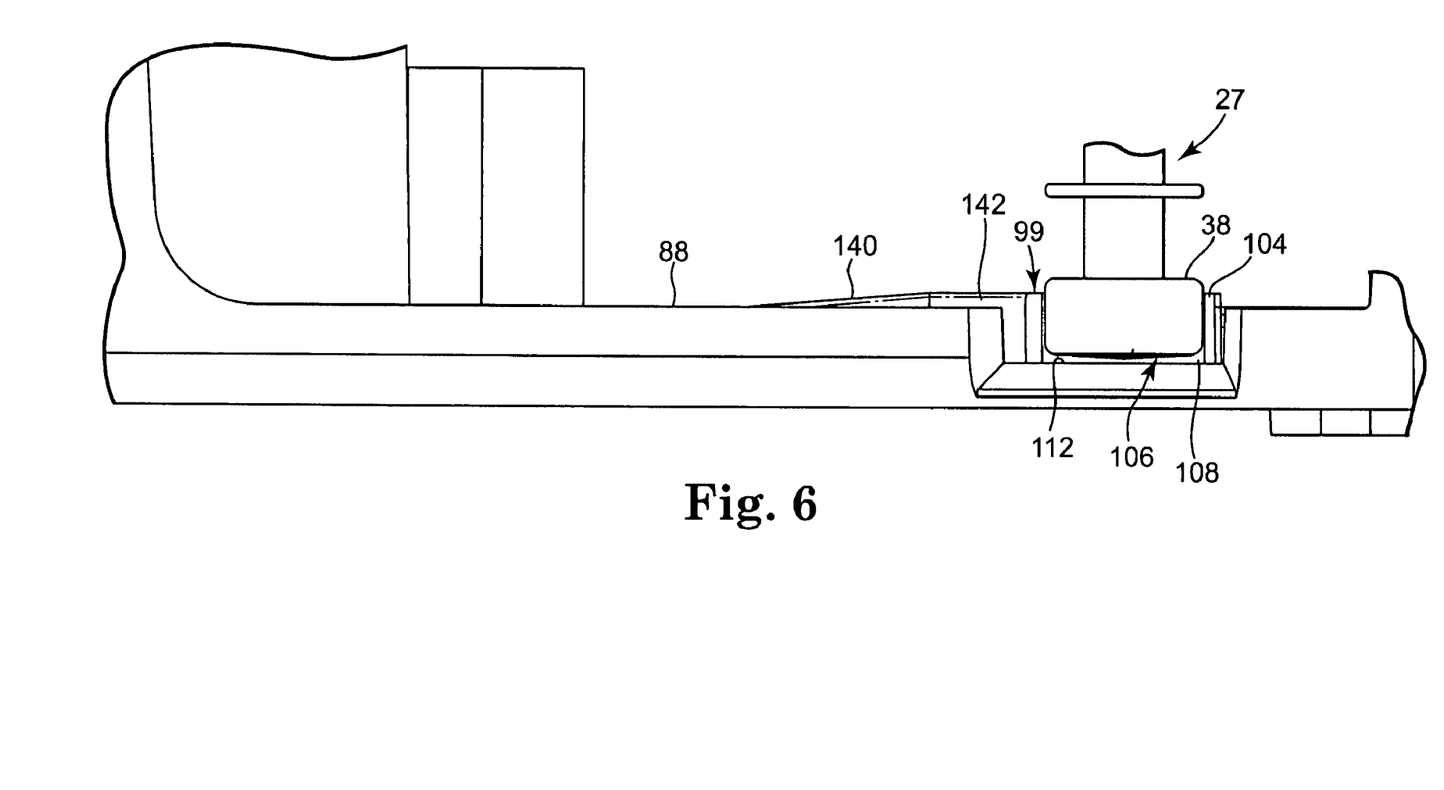
FIG. 6 is a front view of the portion of the leader member access area.

With reference to FIGS. 5 and 6 in particular, the entry section 141, the transition section 140, and the capture section 142 are better shown to define their respective heights. Generally, the capture height is preferably greater than the entry height. In one embodiment, the capture height is approximately 0.006+/−0.002 inches greater than the entry height. The capture height and the entry height can also be described relative to the landing surface 112. Accordingly, in one embodiment, the entry height is approximately 0.044+/−0.001 inches and the capture height is approximately 0.05+/−0.001 inches as measured relative to the landing surface 112.

With reference to FIG. 6, the entry height and the capture height can also be defined relative to the access opening bottom wall 88. In one embodiment, the entry height is substantially the same as the access opening bottom wall 88. In another embodiment, the capture height is greater than that of the access opening bottom wall 88. For example, the capture height can be approximately 0.006+/−0.002 inches greater than the access opening bottom wall 88. In another embodiment, the entry height is less than the access opening bottom wall 88. For example, the entry height can be approximately 0.003+/−0.001 inches less than the access opening bottom wall 88. Additionally, in another embodiment, the access opening bottom wall 88 transitions lengthwise from a first height to a second height.

Figure 7A:
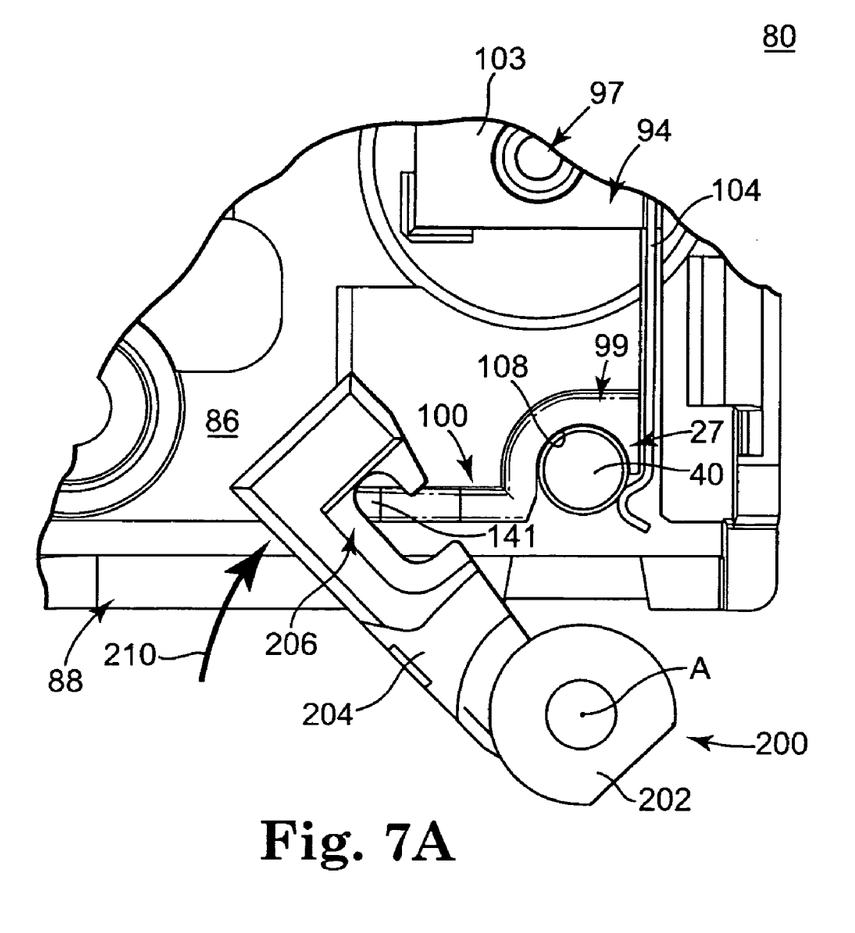
FIGS. 7A-7D illustrate the portion of the leader member access area with a leadering mechanism traveling through a sweep path to access a leader member.

Upon assembly of the data tape storage cartridge 20, and with reference to FIGS. 6 and 7A, the retaining spring 94 is secured within the spring seat 97. By way of reference, the retaining spring 94 includes a spring base 103 and a spring finger 104. In one embodiment, an adhesive or other fixation aid is used in order to secure the retaining spring 94 within the spring seat 97. Once the retaining spring 94 is in the secured position, the spring finger 104 acts in concert with the retention wall 99 to removably secure the leader member first end 38 within the leader member access area 80. In particular, the leader member first end 38 is abutted against the first section 108 of the retention wall 99. Additionally, the leader member first end 38 is abutted against the spring finger 104, which can be deflected in order to remove, or replace, the leader member first end 38 relative to the retention wall 99. While embodiments including the spring 94 have been described herein, it should be noted that alternative embodiments include different means of removably securing the leader member first end 38 against the first section 108, such as tensioning the storage tape 26 (FIG. 1) such that the first end 38 is pulled against the first section 108.

As previously mentioned, the leader member access area 80 preferably includes a second interior surface 90 (FIG. 2) generally located in an opposing position to the first interior surface 86. While details of the second interior surface 90 are not shown or described herein with particularity, the relevant features can largely be described as a mirror image of features described in association with the first interior surface 86. In particular, the second interior surface 90 preferably includes a door slot mirroring the door slot 96. Additionally, the second interior surface 90 preferably includes a retention wall defining sections similar to those described in association with retention wall 99. Further, the preferred second interior surface 90 includes a spring seat similar to spring seat 97 for securing a retaining spring similar to retaining spring 94.

In this manner, the leader member second end 40 (FIG. 1) can be removably secured against the retention wall and the retaining spring of the second interior surface 90 in a similar manner to that described above in association with the leader member first end 38 and first interior surface 86. While preferred features of the second interior surface 90 have been generally described above, it should be noted that the second interior surface 90 can include additional features, such as those described in association with the first interior surface 86. For example, the second interior surface 90 could incorporate a recessed area similar to the recessed area 98 as previously described.

A preferred system for accessing a data storage tape in accordance with the present invention includes a data tape storage drive (not shown) having a leadering mechanism 200 and the data storage tape cartridge 20 (FIG. 1). The system and a related method can be more clearly described with reference to FIGS. 7A-7D. As a point of reference, the views illustrated in FIGS. 7A-7D have the second housing section 23 removed from the view to show the first interior surface 86 of the leader member access area 80, the leader member 27, and the leadering mechanism 200. Additionally, the leader member 27 is shown from a top view in FIGS. 7A, 7C, and 7D such that the first end 38 and the elongate member 42 of the leader member 27 are not shown, as the second end 40 blocks them from view.

As shown, the leadering mechanism 200 can be of a type known in the art and generally includes a pivot hub 202 and a body 204 connected to the hub 202. The pivot hub 202 and body 204 affixed thereto are rotatable about a central axis A of the pivot hub 202, respectively. The body 204 includes a generally L-shaped slot 206 configured to accept, or dock, and secure, or capture, the elongate member 42 of the leader member 27. The body 204 also defines a bottom contact surface 208 (shown schematically in FIG. 7B) and can be rotated through a sweep path 210.

Prior to loading of the cartridge 20 into the data storage tape drive (not shown), the leader member 27 is secured within the leader member access area 80 as shown more clearly in FIG. 2. Upon loading, the drive is then actuated to engage the leader member, via the leadering mechanism 200, as follows.

With reference to FIG. 7A, the leadering mechanism body 204 is shown traveling through a beginning portion of the sweep path 210 as the body 204 rotates into the leader member access area 80. In one embodiment, the bottom contact surface 208 (FIG. 7B) contacts the access opening bottom wall 88 when first entering the leader member access area 80. As such, the bottom contact surface 208 is guided through the beginning portion of the sweep path 210 by the access opening bottom wall 88 at the height of the access opening bottom wall 88.

As the body 204 continues through the sweep path 210, the bottom contact surface 208 travels over and along the docking ramp 100. In one embodiment, the entry section 141 is substantially the same height as the height of the access opening bottom wall 88. As such, the bottom contact surface 208 is guided further through the beginning portion of the sweep path 210 by at least both the access opening bottom wall 88 and the entry section 141 of the docking ramp 100 at the height of the access opening bottom wall 88, in this case, and the entry height. In an alternative embodiment, the entry section 141 has a greater height than the access opening bottom wall 88 and the remainder of the first interior surface 86 is configured such that the bottom contact surface 208 of the body 204 does not contact any surface of the first interior surface 86 other than that of the entry section 141 of the docking ramp 100. In yet another alternative embodiment, the entry section 141 has a height less than that of the access opening bottom wall 88. With this embodiment, the bottom contact surface 208 does not contact the docking ramp entry section 141 as it travels over that section of the docking ramp 100.

Figure 7B:
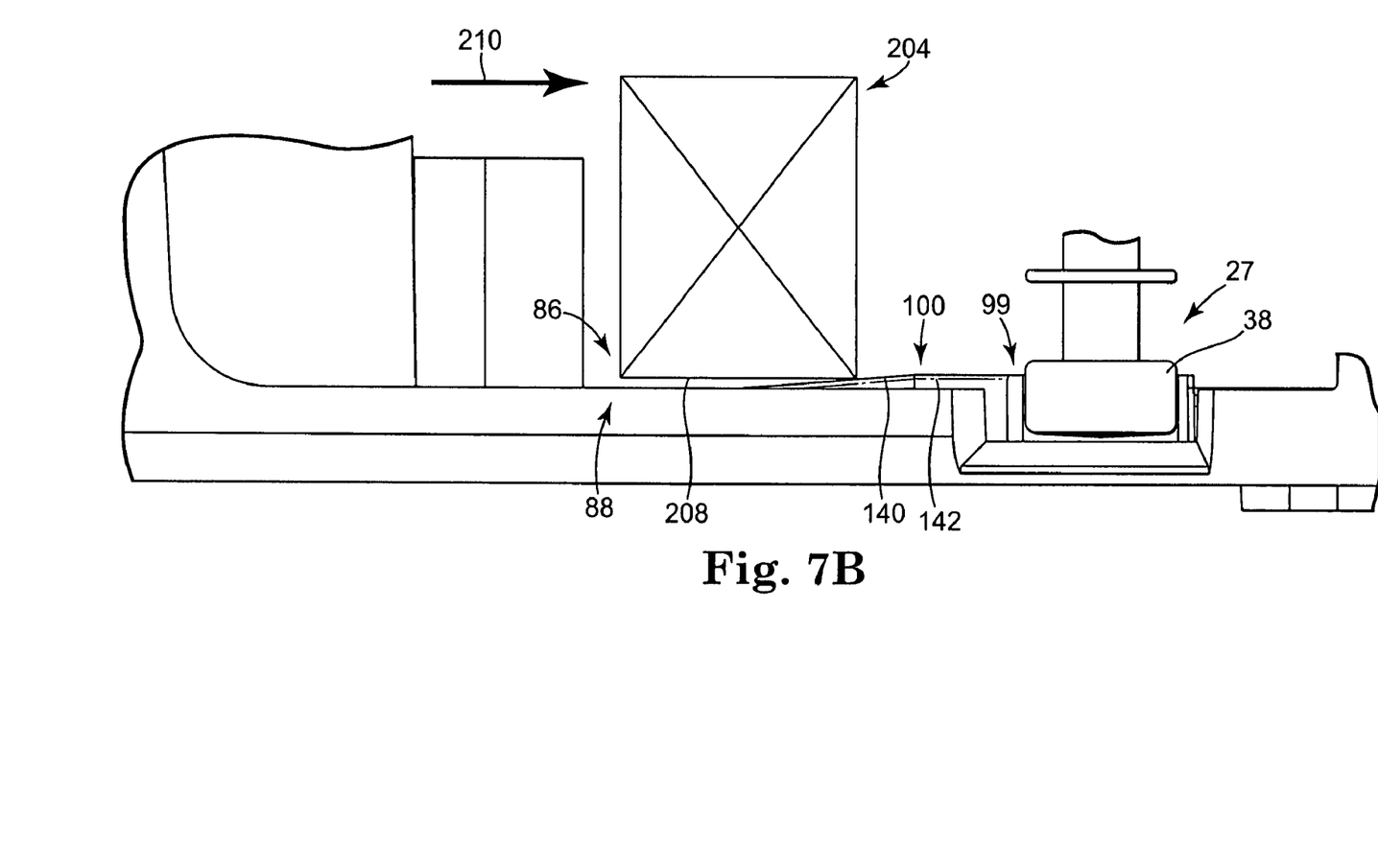

With reference to FIG. 7B, the leadering mechanism body 204 is shown generically by a featureless box. The body 204 preferably travels through an intermediate portion of the sweep path 210 such that the bottom contact surface 208 travels over and along the docking ramp transition section 140. The bottom contact surface 208 of the body 204 contacts the transition section 140 and is gradually and smoothly guided from the entry height, or alternatively the height of the access opening bottom wall 88, to the capture height just prior to the capture section 142. In one embodiment, the bottom contact surface 208 will be guided to a height above that of the access opening bottom wall 88 such that the bottom contact surface 208 is effectively riding on the transition section 140 and no longer contacting the access opening bottom wall 88. In a related embodiment, the bottom contact surface 208 will be guided to a height such that the bottom contact surface 208 is riding on the transition section 140 and no longer contacting any other surface of the first interior surface 86.

As the leadering mechanism body 204 continues further through the sweep path 210 to an end portion of the sweep path 210, the bottom contact surface 208 preferably travels over and along the docking ramp capture section 142. In one embodiment, the bottom contact surface 208 of the body 204 contacts the docking ramp capture section 142 and is guided at the capture height toward the leader member 27. In a related embodiment, the bottom contact surface 208 preferably only contacts the docking ramp capture section 142 until reaching the retention wall 99. The bottom contact surface 208 then travels over and contacts the capture section 142 until reaching the retention wall 99. The retention wall 99 preferably has the same height as the capture section 142 such that the bottom contact surface 208 can smoothly travel over and contact both the capture section 142 and the retention wall 99 thus arriving at an end of the sweep path 210.

Figure 7C:
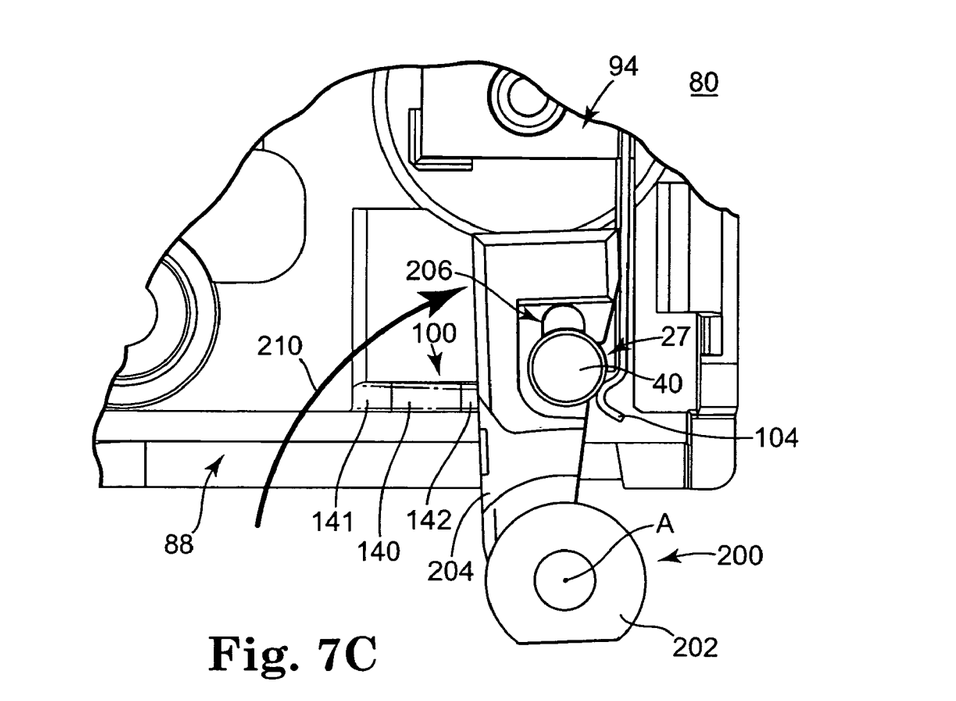

FIG. 7C illustrates the body 204 at the end of the sweep path 210. In the figure, the retention wall 99 is hidden from view by the body 204. With reference to FIG. 7C, the leadering mechanism body 204 will preferably travel through the sweep path 210 such that the L-shaped slot 206 is positioned around the elongate member 42 (FIG. 7B) of the leader member 27. In this position, the leadering mechanism 200 is effectively docked with the leader member 27.

Figure 7D:
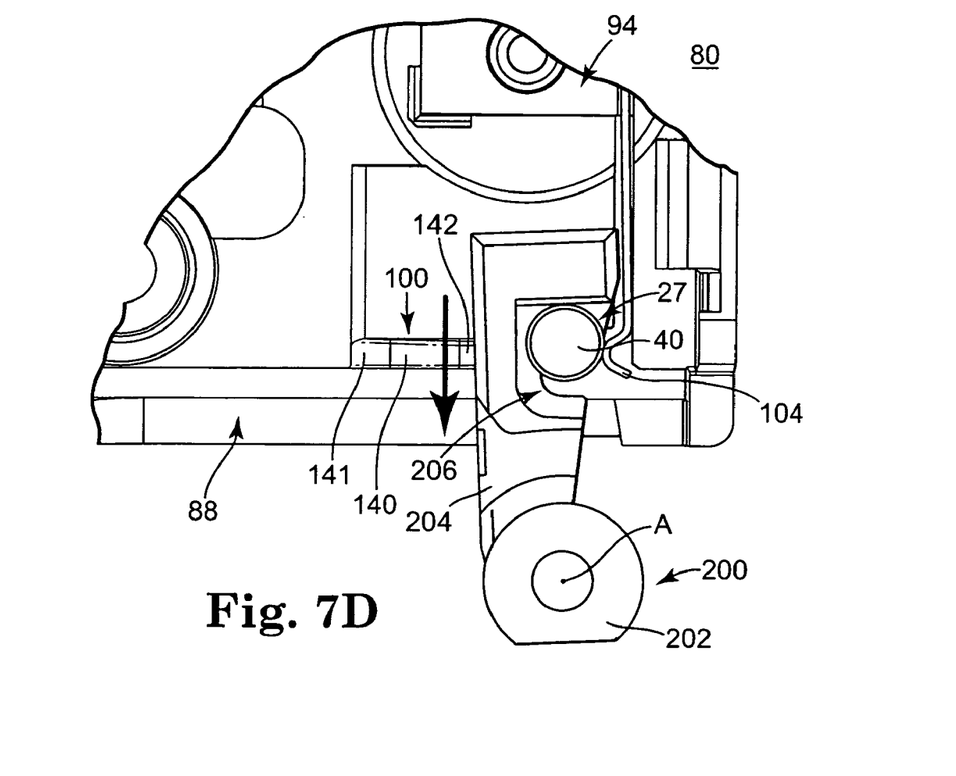

As shown in FIG. 7D, the data storage tape drive (not shown) operates to retract the leadering mechanism 200 out of the leader member access area 80. As the leadering mechanism 200 retracts, the leader member 27 is preferably captured, or secured, within the L-shaped slot 206 of the body 204 as shown in FIG. 7D. The data storage tape drive then operates to further retract the leadering mechanism 200, and thus the leader member 27, from the housing 21 such that the leader member 27 is removed from the retention wall first section 108 (shown covered by the body 204 in FIG. 7D) with the retaining spring 94 being deflected away from the leader member first end 38 (FIG. 7B) to release the leader member 27. In one embodiment, the leader member second end 40 will be removed similarly, including the second interior surface 90 (FIG. 1) having its retaining spring (not shown) deflected. Finally, the leadering mechanism 200 extracts the leader member 27 from the leader member access area 80 along with the storage tape 26 (FIG. 1) affixed thereto.

A method of replacing the leader member 27 generally includes guiding the leader member 27 back into the leader member access area 80 such that it is removably secured against the retention wall 99. In broad terms, the leader member 27 is preferably replaced in a reverse method to removal of the leader member 27. As such, the leader member 27 first end 38 is partially guided by the second section 109 and third section 110 toward the first section 108. In addition to the retaining spring 94, tension on the storage tape 26 (FIG. 1) as maintained by the brake assembly 28 can also be used to removably secure the leader member 27 against the retention wall 99.

The preferred interaction between the leadering mechanism 200 and the leader member access area 80 described above addresses problems either not properly addressed or not previously understood. For instance, in certain circumstances, the bottom contact surface 208 has surprisingly been found to drag on the first interior surface 86 of prior designs. Indeed, such dragging was observed under high speed video to show the leadering mechanism body 204 arrest its motion part way through the sweep path 210 and before properly addressing the leader member 27.

Such dragging can be at least partially associated with the common occurrence of improper seating of the data storage tape cartridge 20 within the data storage tape drive (not shown). As may be understood from the description above, several features described in association with the present invention address problems associated with such undesirable interference between the leadering mechanism 200 and the leader member access area 80 that may arise from improper seating or other sources.

It has been observed that the use of the docking ramp 100 incorporates the particular advantage of guiding the leadering mechanism 200 through the sweep path 210 to the leader member 27 with less contact surface resistance and therefore less dragging. Also observed, the relieved edges described above reduce scraping resistance between edges of features of the leader member access area 80 and the leadering mechanism body 204 as it travels through the sweep path 210. As indicated, incorporation of the recessed area 98 also aids in reducing unwanted contact between the leadering mechanism 200 and the first interior surface 86.

Further, the preferred height indicated for the retention wall 99 can have the additional benefit of greater repeatability in removably securing the leader member 27 to the retention wall 99. In particular, a taller retention wall 99 results in the retention wall sections 108, 109, 110 acting to better secure and guide the leader member 27, and in particular, the first end 38 of the leader member 27, as it is seated in and removed from the leader member access area 80. In other words, the preferred height ensures that the first end 38 is seated in a more preferably sized "pocket." Further, this preferred height also helps to prevent a collision between the first end 38 of the leader member 27 with the leadering mechanism 200 during its motion through the sweep path 210. Removal repeatability can be further augmented in one embodiment having the retention wall second section 109 with the preferred length described. In particular, the embodiment allows the leader member first end 38 to abut against the second section 109 for a longer distance and in the same direction the leader member 27 is being removed.

In summary, the present invention offers several advantages over previous designs. In particular, and in light of the features and their combination as described above, the present invention presents a data storage tape cartridge incorporating a more robust interaction with leadering mechanisms of data storage tape drives by facilitating repeatable and accurate tape drive leadering mechanism interactions with the data storage tape cartridge.

What is claimed is:

1. A data storage tape cartridge comprising:
 a housing having an access opening, a first interior surface of the housing proximate the access opening including:
  a retention wall, and
  a docking ramp defining a capture height proximate the retention wall and an entry height opposite the capture height, the docking ramp configured to transition lengthwise from the entry height to the capture height, wherein the capture height is greater than the entry height, the capture height being substantially equivalent to a height of at least a portion of the retention wall;
 a tape reel assembly including a hub, the tape reel assembly disposed within the housing;
 a storage tape wrapped about the hub; and
 a leader member fixed to a leading end of the storage tape, wherein a first end of the leader member abuts, and is removably secured to, the retention wall of the housing, wherein a front face and a back face on the docking ramp are unsupported.

2. The data storage tape cartridge of claim 1, wherein the first interior surface of the housing defines a bottom wall of the access opening, and further wherein the capture height of the docking ramp is greater than a height of the bottom wall of the access opening.

3. The data storage tape cartridge of claim 2, wherein the entry height of the docking ramp is the same as a height of the bottom wall of the access opening.

4. The data storage tape cartridge of claim 1, wherein the first interior surface of the housing defines a bottom wall of the access opening, and further wherein the bottom wall of the access opening transitions lengthwise from first height to a second height.

5. The data storage tape cartridge of claim 1, wherein the first interior surface of the housing defines a bottom wall of the access opening, and further wherein a door slot is formed in the first interior surface of the housing, such tat the door slot extends between the docking ramp and the bottom wall of the access opening.

6. The data storage tape cartridge of claim 1, wherein a recessed area is formed in the first interior surface, the recessed area starting from the docking ramp and the retention wall and extending away from the access opening, the recessed area having a height less than that of the retention wall.

7. The data storage tape cartridge of claim 6, wherein the recessed area has a height less than tat of the entry height of the docking ramp.

8. The data storage tape cartridge of claim 7, wherein the recessed area is sized to reduce the contact area between a leadering mechanism and the first interior surface as the leadering mechanism travels through the sweep path.

9. The data storage tape cartridge of claim 1, wherein the docking ramp extends lengthwise parallel to the access opening.

10. The data storage tape cartridge of claim 1, wherein the docking ramp transitions from the entry height to the capture height in a generally linear fashion.

11. The data storage tape cartridge of claim 1, wherein a top face and a front face of the docking ramp define a relieved front edge.

12. The data storage tape cartridge of claim 1, wherein a top face and a back face of the docking ramp define a relieved back edge.

13. The data storage tape cartridge of claim 1, wherein a top face and a front face of the retention wall defines a relieved front edge.

14. The data storage tape cartridge of claim 1, wherein a top face and a back face of the retention wall defines a relieved back edge.

15. The data storage tape cartridge of claim 1, wherein a front face and a back face of the retention wall are unsupported.

16. The data storage tape cartridge of claim 1, wherein the retention wall is continuous with the docking ramp.

17. The data storage tape cartridge of claim 1, wherein the leader member is a leader pin.

18. A method for accessing a leader pin of a data storage tape cartridge comprising:
   moving a leadering mechanism of a data storage tape drive into an access opening of a data storage tape cartridge;
   moving the leadering mechanism through a sweep path to access a leader member of the data storage tape cartridge, the leader member removably secured to a retention wail formed by a first interior surface of the housing proximate the access opening;
   guiding the leadering mechanism as it moves through the sweep pat to a capture height via a docking ramp, wherein the docking ramp transitions lengthwise from an entry height to the capture height, the capture height being substantially equivalent to a height of at least a portion of the retention wall;
   docking the leadering mechanism with the leader member;
   capturing the leader member with the leadering mechanism; and
   removing the leader member from the data storage tape cartridge through the access opening with the leadering mechanism.

19. A system for accessing a leader member of a data storage tape cartridge comprising:
   a data storage tape cartridge including:
      a housing having an access opening, a first interior surface of the housing proximate the access opening including:
         a retention wall, and
         a docking ramp transitioning lengthwise from an entry height to a capture height greater than the entry height, the capture height being substantially equivalent to a height of at least a portion of the retention wall;
      a tape reel assembly including a hub, the tape reel assembly disposed within the housing,
      a storage tape wrapped about the hub, and
      a leader member fixed to a leading end of the storage tape, wherein a first end of the leader member abuts, and is removably secured to, the retention wall, of the housing; and
   a tape drive including a leadering mechanism, the leadering mechanism configured to capture and remove the leader member of the data storage tape cartridge by entering the access opening and traveling through a sweep path to the leader member;
   wherein, the docking ramp is configured to guide the leadering mechanism to the capture height as the leadering mechanism travels through the sweep path.

* * * * *

UNITED STATES PATENT AND TRADEMARK OFFICE
CERTIFICATE OF CORRECTION

PATENT NO. : 7,243,871 B2  Page 1 of 1
APPLICATION NO. : 10/952675
DATED : July 17, 2007
INVENTOR(S) : Jason E. Moses et al.

It is certified that error appears in the above-identified patent and that said Letters Patent is hereby corrected as shown below:

Column 13
  Line 12, "tat" should read --that--.
  Line 22, "tat" should read --that--.

Column 14
  Line 9, "wail" should read --wall--.
  Line 12, "pat" should read --path--.
  Line 48, "wherein," should read --wherein--.

Signed and Sealed this

Fifth Day of August, 2008

JON W. DUDAS
*Director of the United States Patent and Trademark Office*